(12) United States Patent
Duran

(10) Patent No.: US 11,393,102 B2
(45) Date of Patent: Jul. 19, 2022

(54) AUTONOMOUS CAMERA-TO-CAMERA CHANGE DETECTION SYSTEM

(71) Applicant: Jemez Technology LLC, Los Alamos, NM (US)

(72) Inventor: Melvin G. Duran, Los Alamos, NM (US)

(*) Notice: Subject to any disclaimer, the term of this patent is extended or adjusted under 35 U.S.C. 154(b) by 0 days.

(21) Appl. No.: 16/983,538

(22) Filed: Aug. 3, 2020

(65) Prior Publication Data
US 2020/0364879 A1 Nov. 19, 2020

Related U.S. Application Data

(63) Continuation of application No. 16/550,739, filed on Aug. 26, 2019, now Pat. No. 10,762,638, which is a continuation of application No. 15/939,202, filed on Mar. 28, 2018, now Pat. No. 10,410,357, which is a continuation of application No. 14/840,248, filed on Aug. 31, 2015, now Pat. No. 9,984,466.

(60) Provisional application No. 62/044,824, filed on Sep. 2, 2014.

(51) Int. Cl.
| | |
|---|---|
| *G06K 9/00* | (2006.01) |
| *G06T 7/20* | (2017.01) |
| *H04N 7/18* | (2006.01) |
| *H04N 5/232* | (2006.01) |
| *G06T 7/207* | (2017.01) |
| *G06T 7/292* | (2017.01) |
| *G06T 7/254* | (2017.01) |
| *H04N 5/247* | (2006.01) |

(52) U.S. Cl.
CPC ............ *G06T 7/20* (2013.01); *G06T 7/207* (2017.01); *G06T 7/254* (2017.01); *G06T 7/292* (2017.01); *H04N 5/23212* (2013.01); *H04N 5/23222* (2013.01); *H04N 5/23229* (2013.01); *H04N 5/23232* (2013.01); *H04N 5/23296* (2013.01); *H04N 7/181* (2013.01); *H04N 7/188* (2013.01); *G06T 2207/10016* (2013.01); *G06T 2207/20024* (2013.01); *G06T 2207/30232* (2013.01); *G06T 2207/30244* (2013.01); *H04N 5/247* (2013.01)

(58) Field of Classification Search
CPC .......... G06T 7/20; G06T 7/254; G06T 7/207; G06T 7/292; G06T 2207/20024; G06T 2207/30244; G06T 2207/10016; G06T 2207/30232; H04N 5/23229; H04N 5/23212; H04N 5/23222; H04N 5/23232; H04N 7/181; H04N 7/188; H04N 5/23296; H04N 5/247
USPC ....................................................... 382/103
See application file for complete search history.

(56) References Cited

U.S. PATENT DOCUMENTS

| | | | |
|---|---|---|---|
| 8,737,685 B2 * | 5/2014 | Becker | ............... G06T 7/254 |
| | | | 382/103 |
| 9,984,466 B1 | 5/2018 | Duran | |
| 10,410,357 B1 | 9/2019 | Duran | |
| 10,762,638 B2 | 9/2020 | Duran | |

(Continued)

*Primary Examiner* — Van D Huynh

(57) ABSTRACT

Embodiments disclosed herein are directed to an autonomous camera-to-camera scene change detection system whereby a first camera controls a second camera without human input. More specifically, a first camera having a field of view may receive and process an image. Based on the processed image, the first camera sends instructions to a second camera to focus in on an area of interest or a target identified in the processed image.

20 Claims, 12 Drawing Sheets

(56) References Cited

U.S. PATENT DOCUMENTS

| | | | | |
|---|---|---|---|---|
| 2001/0019357 | A1* | 9/2001 | Ito | H04N 7/181 |
| | | | | 348/152 |
| 2006/0256201 | A1* | 11/2006 | Shuttleworth | G08B 13/19619 |
| | | | | 348/211.9 |
| 2010/0013917 | A1* | 1/2010 | Hanna | G08B 13/19608 |
| | | | | 348/143 |
| 2010/0201787 | A1* | 8/2010 | Zehavi | G08B 13/19697 |
| | | | | 348/48 |
| 2010/0278452 | A1* | 11/2010 | Sarkijarvi | G06T 7/90 |
| | | | | 382/307 |
| 2011/0181716 | A1* | 7/2011 | McLeod | H04N 7/181 |
| | | | | 348/143 |
| 2012/0169882 | A1* | 7/2012 | Millar | G08B 13/19608 |
| | | | | 348/159 |
| 2012/0236173 | A1* | 9/2012 | Telek | G03B 7/00 |
| | | | | 348/223.1 |
| 2016/0078298 | A1* | 3/2016 | Wu | G08B 13/19643 |
| | | | | 348/143 |

\* cited by examiner

AUTONOMOUS CAMERA-TO-CAMERA CHANGE DETECTION SYSTEM

CROSS-REFERENCE TO RELATED APPLICATIONS

This application is a continuation patent application of and claims the benefit of U.S. Non-Provisional patent application Ser. No. 16/550,739, filed Aug. 26, 2019, now issued U.S. Pat. No. 10,762,638, and titled "AUTONOMOUS CAMERA-TO-CAMERA CHANGE DETECTION SYSTEM," which is a continuation application of U.S. Non-Provisional patent application Ser. No. 15/939,202, filed Mar. 28, 2018, now issued U.S. Pat. No. 10,410,357, and titled "AUTONOMOUS CAMERA-TO-CAMERA CHANGE DETECTION SYSTEM," which is a continuation application of U.S. Non-Provisional patent application Ser. No. 14/840,248, filed Aug. 31, 2015, now issued U.S. Pat. No. 9,984,466 and titled "AUTONOMOUS CAMERA-TO-CAMERA INTRUSION DETECTION SYSTEM," which claims priority to U.S. Provisional Patent Application No. 62/044,824, filed Sep. 2, 2014, and titled "AUTONOMOUS CAMERA-TO-CAMERA INTRUSION DETECTION SYSTEM," the disclosures of each of which are hereby incorporated herein by reference in their entirety.

TECHNICAL FIELD

The present disclosure is directed to a scene change detection system. More specifically, the present disclosure is directed to a scene change detection and object tracking system in which a first camera of the system is configured to control or otherwise send commands to a second camera of the system.

BACKGROUND

Security cameras and systems are used in many situations to help protect property and other assets. However, conventional security systems typically require a security guard or even multiple security guards to spend many man hours watching live or recorded footage from these cameras. After a few hours, the observers may get distracted, fatigued or may simply miss activity that could be seen as potentially dangerous. In addition, a field of view of the cameras is typically locked or set based on the position of the camera. Thus, a security guard may not be able to focus in on an area or person of interest. For scenes where there is a lot of activity, it may not be possible for observers to detect a change in the scene that may be a threat. Even if the threat is detected, it may not be possible to track the threat. Additionally, detection systems are plagued with false alarms which can quickly become very annoying to operators.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments disclosed herein are directed to an autonomous camera-to-camera scene change detection system whereby a first camera controls a second camera without human input. More specifically, a first camera having a field of view may receive and process an image. Based on the processed image, the first camera sends instructions to a second camera to focus in on an area or a target of interest identified in the processed image.

Also disclosed is an image sensor having a processing unit and a memory that is coupled to the processing unit. The memory stores instructions that are executed by the processing unit to capture images. The image sensor is configured to capture a first series of images and analyze the first series of images to determine one or more expected or anticipated changes in the first series of images. The image sensor may then capture a second series of images. Upon determining that at least one image in the second series of images has one or more unanticipated, unexpected or unwanted changes, image capturing instructions are transmitted to a second image sensor.

A method of capturing an image is also disclosed herein. This method includes receiving a reference image at a first image sensor and receiving a second image at the first image sensor. Once the images are received, the second image is compared to the reference image to determine one or more types of changes between the second image and the reference image. A filter may then be generated based on the determined one or more types of changes between the second image and the reference image. A third image may then be captured by the first image sensor. Once the third image is captured, the filter is applied to the third image to remove anticipated or expected changes from the third image. Once the expected changes have been removed, unexpected changes in the third image may be identified.

BRIEF DESCRIPTION OF THE DRAWINGS

Embodiments of the present disclosure may be more readily described by reference to the accompanying drawings in which like numbers refer to like items and in which.

DETAILED DESCRIPTION

Figure 1:
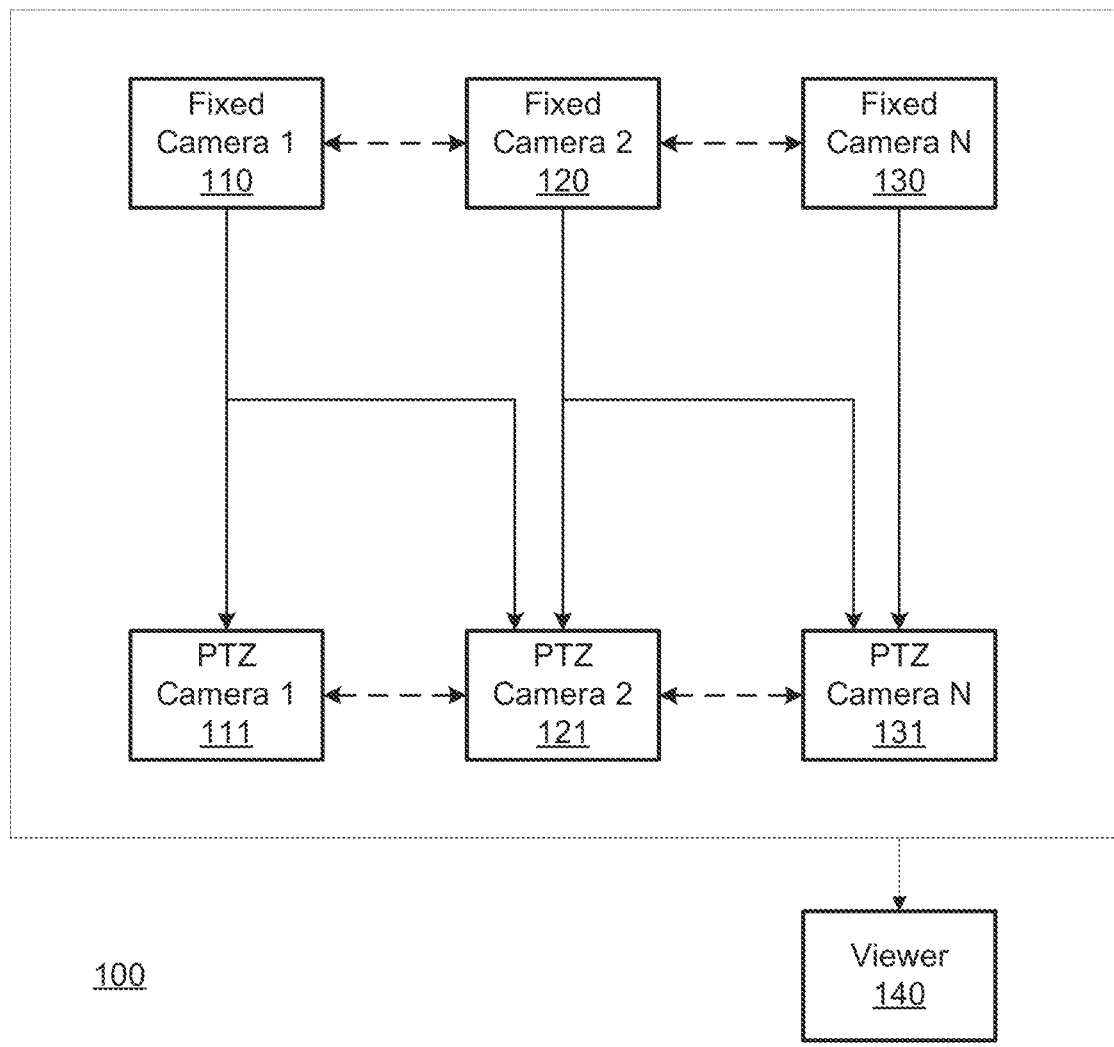
FIG. 1 illustrates an example autonomous camera-to-camera scene change detection system according to one or more embodiments of the present disclosure.

Various embodiments are described more fully below with reference to the accompanying drawings, which form a part hereof, and which show specific embodiments for practicing the embodiments described herein. However, various embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects.

Embodiments disclosed herein are directed to an autonomous camera-to-camera scene change detection system (hereinafter, "the system"). The system may include two or more cameras that autonomously operate to automatically detect and track unwanted changes in a captured scene, image or series of images. As used herein, the term "autonomous" means that human support or input is not required for the cameras, or for the overall system, to operate. In some embodiments, the cameras are closed-circuit television (CCTV) cameras although other cameras and/or image sensors may be used.

As will be described in detail below, the system includes, among other components, a synthesizer and a camera-to-camera communication protocol. The synthesizer filters an image captured by one of the cameras in order to determine changes in the captured image (or series or sequences of images). In some implementations, the synthesizer may use a series of filters to remove known image or scene changes and/or remove changes that may be created by changing environmental conditions. The remaining changes are then assessed to determine whether the changes are a potential threat or if the changes will be ignored. If the changes are determined to be a potential threat, the first camera may then autonomously command and/or control a second, moveable camera of the system to focus on, zoom-in on or otherwise track the changes that were identified. If the changes are not identified as a potential threat, the changes are ignored.

For example, a first camera of the system may be fixed or otherwise mounted on a platform or structure. In this example, the first camera may have a lens with a specific or fixed field of view. The first camera may capture or otherwise receive an image from its image sensor. The image may then be processed by a synthesizer of the system. Once the image has been processed, and based on the results of the processed image, the first camera uses the camera-to-camera communication protocol to command or otherwise control a second, moveable camera. That is, the first camera may provide pointing instructions, zoom instructions and so on to the second camera which causes the second camera to focus on an area or a target of interest that was identified in the processed image.

FIG. 1 illustrates an example autonomous camera-to-camera scene change detection system 100 according to one or more embodiments of the present disclosure. More specifically, the scene change detection system 100 may include a first type of camera or image sensor that is communicatively coupled to second type of camera or image sensor. The first type of camera or image sensor may be stationary (e.g., fixed) having a fixed field of view and the second camera may be moveable such that the second camera may be able to view any object or location within the field of view of the first camera.

In other embodiments, the first type of camera or image sensor may be partially stationary (e.g., have limited movement) and have a semi-fixed field of view. In yet another embodiment, the first camera or image sensor may be moveable and/or rotatable about various axes and provide a variety of different fields of view. In addition, various combinations of the above are contemplated. It is also contemplated that the first camera or image sensor may be able to zoom in and out on a particular area and so on.

Although the first type of camera or image sensor may be described as any of the above, the first camera or image sensor will be referred to herein as a fixed camera. As shown in FIG. 1, the scene change detection system 100 may include a number of fixed cameras including fixed camera 1 110, fixed camera 2 120 and fixed camera N 130.

In some embodiments, each fixed camera may be positioned or orientated such that the fixed camera has a fixed or predetermined field of view. For example, fixed camera 1 110 may be pointed at a first set of XY coordinates, fixed camera 2 120 may be pointed at a second set of XY coordinates and fixed camera N 130 may be pointed at a third set of XY coordinates. In some embodiments, each set of coordinates may be unique with respect to one another. In another embodiment, some of the XY coordinates may overlap, or at least partially overlap, with each other.

Each of the fixed cameras in the scene change detection system 100 may be communicatively coupled with a respective second camera or images sensor. In some embodiments, the second camera or image sensor is a moveable camera or moveable image sensor. More specifically, the second camera or image sensor may be a pan tilt and zoom (PTZ) camera. Although FIG. 1 and the remainder of the description of FIG. 1 refers to the second type of camera as a PTZ camera, embodiments of the present disclosure are not so limited. As such, the second camera or image sensor may be any type of camera (e.g., a high definition sensor that may include various megapixel image sensors) for capturing live and/or still images.

As shown in FIG. 1, each fixed camera in the system 100 may be communicatively coupled with respective PTZ cameras. For example, fixed camera 1 110 may be communicatively coupled to PTZ camera 1 111 and communicatively coupled to PTZ camera 2 121. Likewise, fixed camera 2 120 may be communicatively coupled to PTZ camera 2 121 and PTZ camera N 131. In addition, fixed camera N 130 may be communicatively coupled to PTZ camera N 131.

Although various configurations are shown and described, each of the cameras in the system 100 may be communicatively coupled to each of the other cameras in a variety of ways. For example, fixed camera 1 110 may only be coupled to PTZ camera 1 111 while fixed camera 2 120 may be communicatively coupled to each PTZ camera in the system 100.

Further, the system 100 may include various combinations of the different types of cameras. For example, the system 100 may contain one fixed camera and multiple PTZ cameras. Alternatively, the system 100 may contain multiple fixed cameras and a single PTZ camera. In such embodiments, or in the other embodiments described herein, each fixed camera may have a priority with respect to the other fixed camera in the system 100.

The priority may be based on XY coordinates of the field of view or the position of each fixed camera, an amount of unwanted change that is detected in each received image (e.g., an image captured by the first fixed camera has more unwanted changes than a second fixed camera and therefor receives priority) and so on. When such a priority is established, the PTZ camera may be configured to communicate with the fixed camera having the first priority and then address the instructions received from the fixed camera having the second priority.

In another embodiment, the priority between the fixed cameras may be present even if the fixed cameras are communicatively coupled to multiple PTZ cameras. For example, fixed camera 1 110 and fixed camera 2 120 may each be communicatively coupled to PTZ camera 1 111 and PTZ camera 2 121. If fixed camera 1 110 has a higher priority than fixed camera 2 120, and both fixed cameras have detected unwanted changes in a captured image, PTZ camera 1 111 may follow instructions received by fixed camera 1 110 and PTZ camera 2 121 may follow instructions received by fixed camera 2 120.

In some embodiments, when the PTZ cameras are coupled to multiple fixed cameras, the PTZ cameras may be configured to communicate to the fixed cameras that they are being utilized by a fixed camera with a higher (or lower) priority. As a result, the fixed camera may be instructed or otherwise configured to utilize another PTZ camera, interrupt the current use of the PTZ camera by the fixed camera (e.g., a higher priority fixed camera can interrupt use of a PTZ camera by a lower priority fixed camera) and/or wait until the PTZ camera is no longer actively receiving instructions from another fixed camera.

In certain embodiments, the fixed cameras may be communicatively coupled to the PTZ cameras using a variety of communication protocols including custom communication protocols (e.g., camera-to-camera communication protocols). For example, the fixed cameras may communicate with the PTZ cameras using a network connection, an internet connection, wireless communication protocols, analog signals and/or digital signals over hardwires, Supervisory Control and Data Acquisition (SCADA) and so on.

In addition, a first fixed camera of the system may use a first type of communication protocol to communicate with one or more PTZ cameras while a second type of camera in the system 100 may communicate with a PTZ using a second type of communication protocol. When a fixed camera is communicatively coupled to multiple PTZ cameras, the fixed camera may communicate with each PTZ camera using different protocols. In addition, if a PTZ camera is communicatively coupled to multiple fixed cameras, the PTZ camera may use various communication protocols in communicating with each fixed camera.

Each fixed camera may be communicatively coupled to the other fixed cameras in the system 100. For example, fixed camera 1 110 may be communicatively coupled to fixed camera 2 120 and fixed camera N 130. Likewise, each PTZ camera in the system 100 may be communicatively coupled to the other PTZ cameras in the system 100. For example, PTZ camera 1 111 may be communicatively coupled to PTZ camera 121 and PTZ camera N 131.

In such embodiments, one camera in the system, or one camera of each type in the system, may be the "master camera" that may control, or send instructions to, the other cameras in the system 100. As such, the "master camera" may have a field of view that encompasses, partially or fully, the fields of view of all the other cameras in the system 100.

Referring back to FIG. 1 and as discussed above, each fixed camera may have a set or predetermined field of view. In addition, each fixed camera may be coupled to a PTZ camera that has the same or a similar field of view. Thus, and as will be explained in more detail below, as the fixed camera receives one or more images, it compares the received images with one or more reference images and determines whether a scene change or point of interest exists in the received images. If an unwanted or unexpected change exists, the fixed camera sends instructions to the PTZ camera to move or rotate toward and/or zoom toward the point or target of interest that caused the unexpected or unwanted change.

Because the fixed camera is communicatively coupled to the PTZ camera in the system 100 and may be configured to self-prioritize, the system 100 may be configured to operate with little or no human interaction. In addition, the system 100 may be configured to self-prioritize. That is, each camera in the system 100, either working by itself or in conjunction with the other cameras in the system, can decide what to look at, what changes pose potential threats and so on.

For example, fixed camera 1 110 may be pointed or otherwise orientated at a first set of XY coordinates. As such, the fixed camera continually receives a series of still images or a series of live images. As the images are received by fixed camera 1 110, the images are processed and compared against a reference image. As will be explained below, the reference image may be calibrated to account for natural and/or expected movement of various items within the XY coordinates.

For example, if the fixed camera 1 110 was capturing images or otherwise orientated toward a grove of trees, it may be expected that wind may cause the trees to move. Likewise, the image may contain various clouds in the sky, reflection off of buildings or bodies of water, glint, moving shadows due to the position of the sun and so on. As such, fixed camera 1 110 is configured to analyze a fixed camera image by applying a series of filters (derived during configuration of the fixed camera) to the scene and applying the filters to each next resulting image. More specifically, any differences between the incoming image and the reference image are used to determine if any unanticipated or unwanted changes occur within the scene.

When the unwanted change is determined, fixed camera 1 110 may instruct PTZ camera 1 111 and/or PTZ camera 2 121, to move and/or zoom toward the unwanted or unanticipated change within the image. In some embodiments, the PTZ camera may move such that the unwanted change, or the target causing the unwanted change, is within a center or substantially the center of the images being captured.

In some embodiments, as the images are being captured by the fixed and PTZ cameras, the images may be sent to a viewer 140. The viewer may be remote with respect to the various cameras of the system 100. As such, the viewer 140 may be configured to stitch received images together. The viewer 140 may be communicatively coupled to each camera in the system or to individual cameras of the system using various communication protocols such as those described above. In addition, although a single viewer 140 is shown, the system 100 may include multiple viewers 140. The viewer 140 may be used to enable an authorized operator or user to view, access and/or control the various camera and/or images in the system 100.

In some embodiments, each camera in the system 100 may be identified on the network using, for example, a name, IP address or other such identifier. Using the identifier, each fixed camera may be associated with one or more PTZ cameras and vice versa.

In addition, each camera in the system may be configured to perform a self-calibration test. In some embodiments, the calibration of each PTZ camera is used to associate the motion of the PTZ camera with a field of view of one or more fixed cameras the PTZ camera is associated with. In some embodiments, the calibration of the PTZ camera may be manual, automatic or semi-automatic. More specifically, the calibration of the PTZ camera may be used to determine the orientation of the fixed camera and pointing algorithms associated with the fixed camera's set of XY coordinates. The pointing algorithms are used by the fixed camera to invoke the camera-to-camera communication protocol and command the PTZ camera.

The calibration of the PTZ camera consists of using fixed point coordinates (e.g., Cartesian and angular coordinates) in the field of view of the fixed camera. For example calibration includes centering a selected point in the fixed camera's field of view to a center of the field of view of the PTZ camera. That is, the PTZ camera is instructed (by the fixed camera) to move until the filed of view of the PTZ camera is centered on the selected point. The selected point may be any point within the field of the view of the fixed camera. This process may then repeat. More specifically, the fixed camera's field of view coordinates are transmitted to the PTZ camera for its field of view coordinates. The PTZ camera may then use these coordinates when it is commanded to move by the fixed camera.

In another embodiment, the user may select specific objects in the fixed camera image or field of view and select the same objects in the moveable camera. When the object has been selected, the processor unit associated with the fixed camera updates pointing equations for autonomous control of the PTZ camera. Once this is established, the PTZ camera may become familiar with (e.g., know the bounds) the field of view of the fixed camera. In other embodiments, the XY coordinates of the fixed camera field of view may be provided, either manually (e.g., by an operator or user of the system 100) or automatically to the PTZ camera. In some implementations, these coordinates may be provided by a positioning device, such as, for example a GPS device.

In another embodiment, the PTZ camera may be calibrated based on one or more inputs received by a user or operator of the system. In one example, a user or operator may select a target location in the fixed camera image. The selection may be made using mouse clicks, input on a touch sensitive device, entering coordinates etc. Once the input has been received, the moveable camera is aligned to the target location by the operator. The location is then saved and additional points may be selected. This is shown and described in more detail with respect to FIG. 10.

In addition to the above, a user can point to a specified location in the fixed camera window/image on a computer terminal or other input device. In response, the PTZ camera will be directed to that location via the camera-to-camera communication protocol. Accordingly, while a joystick, mouse, keyboard or other similar directional input mechanism may be used, one is not required.

Figure 2:
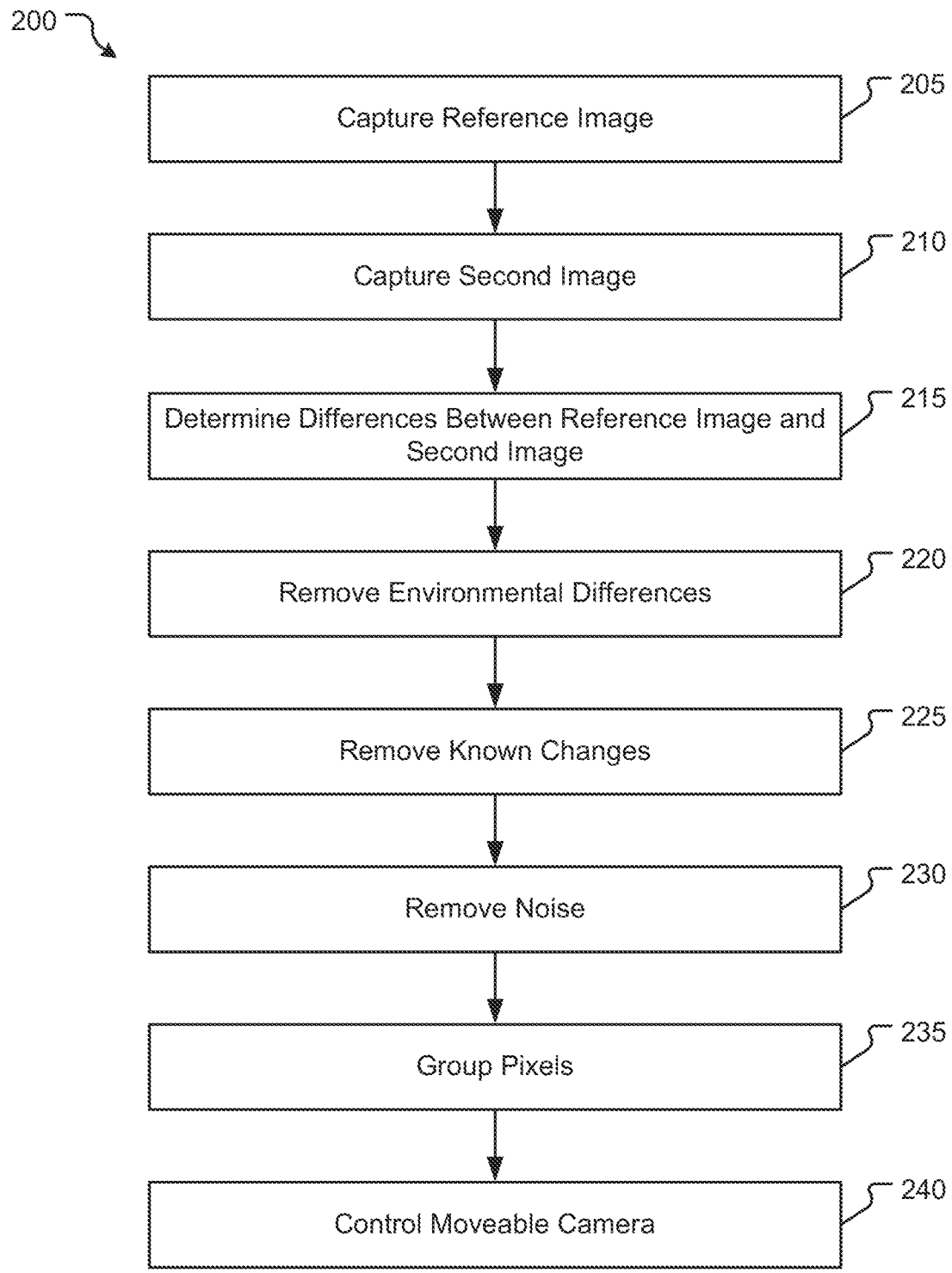
FIG. 2 illustrates a method for capturing and analyzing an image according to one or more embodiments of the present disclosure.

FIG. 2 illustrates a method for capturing and analyzing an image according to one or more embodiments of the present disclosure. The method 200 may be used by the system 100 and/or one or more cameras of the system 100 shown and described above with respect to FIG. 1.

Method 200 begins at operation 205 in which a reference image is captured by a first camera. In some embodiments, the first camera is a fixed camera such as described above. The fixed camera then captures 210 a second image. The second image is used to update the reference image such as will be described below. Flow then proceeds to operation 215 and the differences between the reference image and the second image are determined.

In some embodiments, the reference image and/or the second image may be captured by an image sensor of the first camera. The image sensor may be a single sensor or an array of sensors. Each of the sensors may have a specific field of view. Further, each field of view may be stitched to form a wider or broader field of view (e.g., 180 degrees or more). In another implementation, a camera sensor may be a high definition array divided into sections with specific fields of view (e.g., arrays with millions of pixels) and so on.

Operation 215 uses a synthesizer to processes the reference image, the second image and any subsequent images. The synthesizer applies one or more filters to the images, such as, for example, a curtain filter. The synthesizer may also adjust the sensitivity of the images. Using the filters, the synthesizer is able to determine any differences, on a frame by frame basis, between the reference image and the second image. The differences may encompass all of the changes between the images from the field of view of the fixed camera.

Flow then proceeds to operation 220 and the changes are analyzed to determine which, if any, of the changes are associated with changing environmental conditions. More specifically, the synthesizer consists of a series of filters that analyze ambient conditions in the fixed camera field of view. The filters enable the synthesizer to determine the presence of clouds in the image, movement of shadows with respect to movement of the sun and movement caused by weather conditions (e.g., rain, snow, wind, hail, etc.). As the images are analyzed, the system may learn which changes in the scene can be ignored due to the environmental conditions and which may be potentially dangerous or pose a threat.

Once the environmental changes have been determined, flow proceeds to operation 225 and remaining changes (e.g., changes that are not environmental changes) are processed using another filter (referred to herein as a "known changes filter"). As its name implies, the known changes filter removes all known changes between the reference image and the second image.

For example, a capture zone in the image may be identified. The capture zone may be an area of interest within the fixed camera field of view in which any changes are monitored. Put another way, a fixed camera field of view may be divided into different zones. Some zones may be monitored for changes while other zones are not. In some embodiments, the capture zone may be automatically determined. In other embodiments, the capture zone may be specified by a user or operator of the system. If changes in one of the zones are known or otherwise anticipated (e.g., different cars driving on a highway), these known changes may be disregarded.

Flow then proceeds to operation 230 in which one or more noise filters remove any noise in the image. The noise may consist of reflections, glint, camera platform motion caused by wind, etc.

In operation 235, the pixels of the image are grouped to form potential a target. The size of each of the grouped pixels is analyzed (and may be adjusted) to detect the largest pixel group. The largest pixel group that is selected may be associated with a potential threat or an unwanted change.

In some embodiments, the pixel grouping process may also include setting and determining a minimum and/or a maximum number of pixels that may be required to constitute an unwanted change. For example, if an object has moved into the field of view of the fixed camera but has a number of grouped pixels that exceed the maximum threshold (e.g., a semi-truck driving down the road), the fixed camera may be configured to ignore that the change in the image as it could be labeled as "anticipated." Likewise, if the number of grouped pixels in the image is below a threshold (e.g., an animal moving into the field of view), that may also be ignored as an anticipated change.

Once the thresholds and the filters have been determined in the manner described above, these thresholds and filters are used when subsequent images are captured and analyzed. For example and as discussed above, a synthesizer of the system may be configured to identify the anticipated changes within the fixed camera image that do not appear in the reference image. Thus, when another image is captured, the synthesizer is applied to the second image and the second image is subtracted from the reference image. The second image is then processed by the synthesizer to remove all of the known or anticipated changes from the image and/or ignore changes that do not match user or operator established detection criteria. This leaves the unwanted change in the second image.

If unwanted changes are detected, flow proceeds to operation 240 and the second camera is instructed to pan, tilt and/or zoom toward the unwanted change. For example, the first camera may send movement instructions to the second camera and the second camera can capture and center the unwanted change within its field of view.

In some embodiments, the speed of movement of the second camera may be adjusted based on the position or distance the target is from the second camera. For example, as the target moves, the second camera may be configured to follow the movement of the target. In another embodiment, the position of the target in the field of view of the first camera and/or the second camera may be used to determine movement of the pan/tilt platform and adjustment to the lens of the second camera.

Continuing the example, if the target image is in an upper portion of the field of view of the first camera, the target may be far away. As such, the second camera may need to zoom in on the target or otherwise move such that the target is in the middle of (or close to the middle of) the field of view of the second camera. Likewise, if the target is near the bottom of the field of view of the first camera and/or takes up a large portion of the field of view, the target may be closer to the first camera. As such, the second camera may need to zoom out or otherwise move such that the target is at or near the middle of the field of view of the second camera.

The first camera may automatically adjust the settings (e.g., in pixels) of the second camera based on the determined distance of the target such as discussed above. Thus, although the minimum and maximum size of objects (e.g., in pixels) may have been established such as described above, these values may be automatically and/or temporarily adjusted based on the determined distance of the target. If the values are temporarily adjusted, the synthesizer may determine if the change is an unwanted change or can be ignored.

Figure 3:
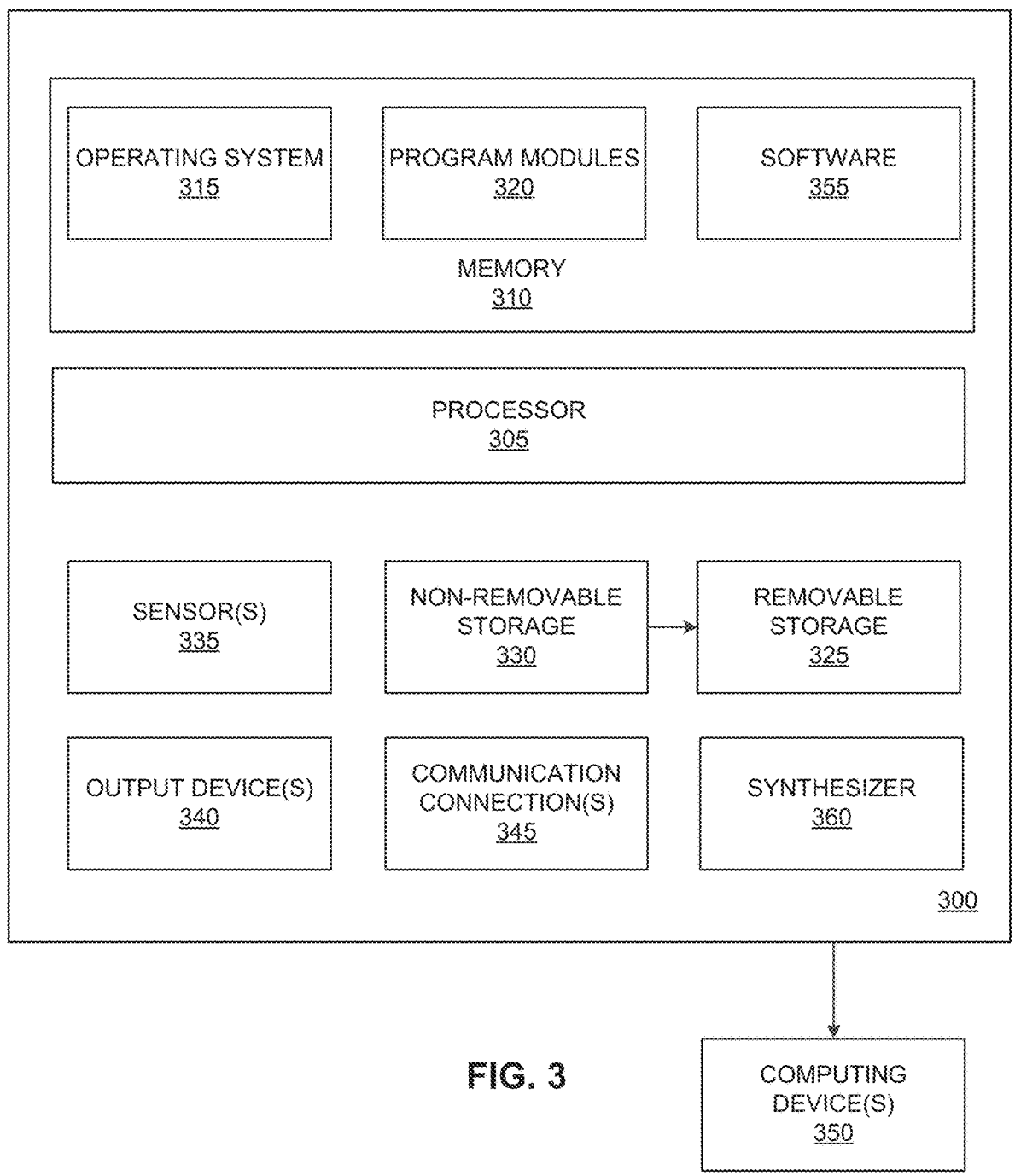
FIG. 3 is a block diagram illustrating example physical components of a computing device that may be used with one or more embodiments of the present disclosure.

FIG. 3 is a block diagram illustrating example components of a device 300. The device 300 may be used in the camera-to-camera change detection system described herein. In some embodiments, the components may be an integrated system within a single structure such as a fixed camera housing. While in other embodiments, the components may each be in separate stand-alone units. Also, in some embodiments, the device 300 may be a moveable camera such as described above with respect to FIG. 1. Although various components of the device 300 are shown, connections and communication channels between each of the components are omitted for simplicity.

In a basic configuration, the device 300 may include at least one processor 305 and an associated memory 310. The memory 310 may include, but is not limited to, volatile storage such as random access memory, non-volatile storage such as read-only memory, flash memory, or any combination thereof. The memory 310 may store an operating system 315 and one or more program modules 320 suitable for running software 355. The program modules 320 or software 355 may include modules and programs for generating filters, performing synthesizer analysis (using synthesizer 360), controlling communications and/or movement of the other cameras and so on.

The device 300 may have additional features or functionality than those expressly described herein. For example, the device 300 may also include additional data storage devices, removable and non-removable, such as, for example, magnetic disks, optical disks, or tape. Example storage devices are illustrated in FIG. 3 by removable storage device 325 and a non-removable storage device 330.

In certain embodiments, various program modules and data files may be stored in the system memory 310. The program modules 320 and the processor 305 may perform processes such as, for example, one or more operations of the methods described herein.

As also shown in FIG. 3, the device 300 may include one or more sensors 335. The sensors 335 may be any type of image sensor configured to capture live and/or still images. Examples include single images sensors, CCD sensor arrays and so on. The device 300 may also include, or be communicatively coupled with one or more output devices 340. The output devices 340 may include a display and other such devices.

The device 300 also includes communication connections 345 that facilitate communications with additional devices 350. The additional devices may be other fixed or moveable camera processing units such as described above with respect to FIG. 1. Such communication connections 345 may include internet capabilities, direct connection capabilities, a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media for the storage of information. Examples include computer-readable instructions, data structures, and program modules. The memory 310, the removable storage device 325, and the non-removable storage device 330 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the device 300. Any such computer storage media may be part of the device 300.

Figure 4:
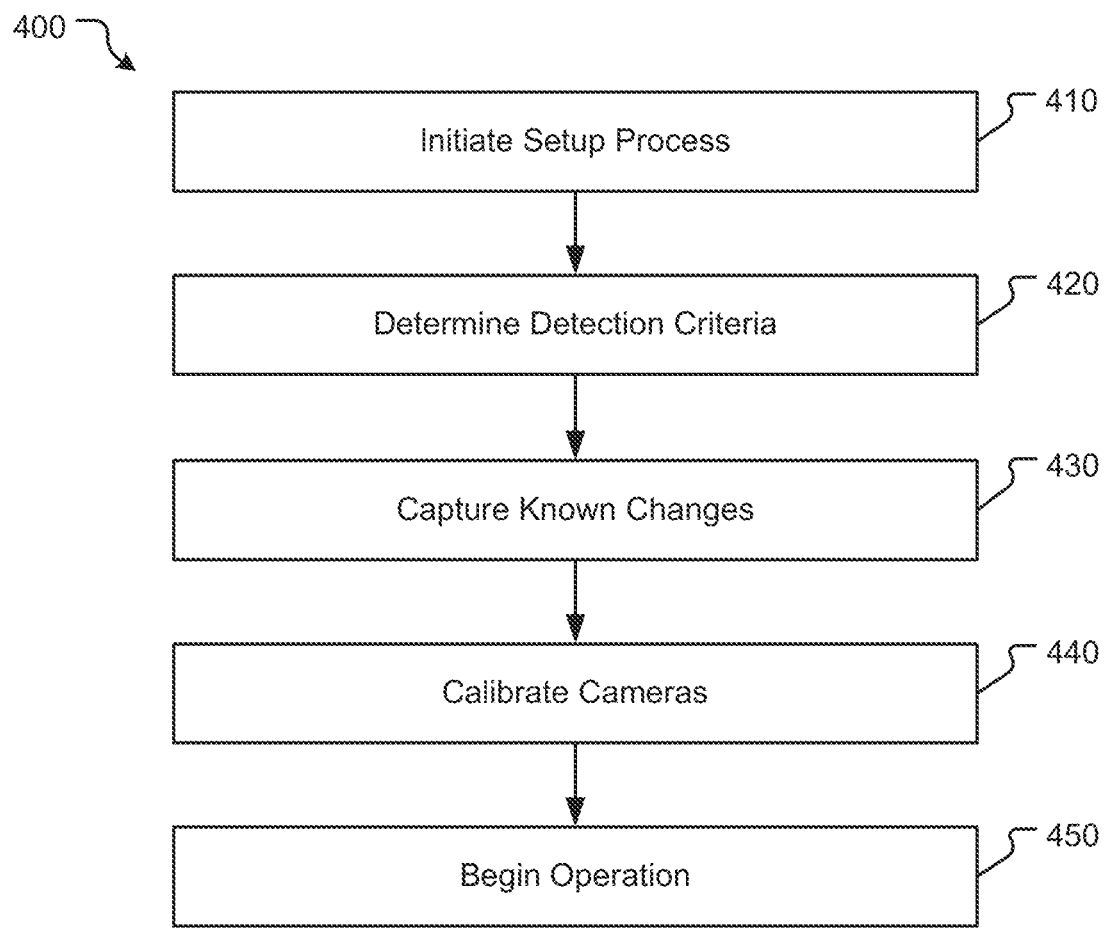
FIG. 4 illustrates a method for setting up and calibrating an autonomous camera-to-camera scene change detection system according to one or more embodiments of the present disclosure.

FIG. 4 illustrates a method 400 for setting up and calibrating an autonomous camera-to-camera change detection system according to one or more embodiments of the present disclosure. In some embodiments, the method 400 may be used in conjunction with the autonomous camera-to-camera change detection system such as described above with respect to FIG. 1. Accordingly, reference may be made to a first type of camera (e.g., a fixed camera) and a second type of camera (e.g., a moveable camera) such as described above.

Method 400 begins at operation 410 in which a setup process is initiated. The setup process may include a user or administrator accessing an operating system of the first camera. In another embodiment, the user or administrator may access a computing system that controls or otherwise communicates with the first camera and/or the second camera.

The setup phase may also include installing or otherwise positioning various cameras at certain locations. For example, a first camera may be installed at a first location and a second camera may be co-located with the first camera.

In some embodiments, the second camera is located within a certain distance (e.g., two feet) from the first camera. Because the first camera and the second camera are co-located, the second camera may be automatically moved or otherwise controlled by the first camera to the absolute position of any location within the field of view of the first camera. As such, the second camera may target an image and in the field of view of the first camera and zoom in on that image. In other embodiments, the second camera may be any distance away from the first camera so long as the cameras can communicate with one another and so long as the second camera can pan, tilt or zoom toward an object of interest identified in the first camera's field of view (or in a field of view of a fixed camera that communicates with or is otherwise associated with the first camera).

The setup process may also include establishing a camera-to-camera communication protocol between the first camera and the second camera. In some embodiments, information about the cameras may be used to establish the communication protocol. For example, the system may collect a location addresses of each camera, manufacturer information for each camera, user names and passwords of users or administrators that access or otherwise control the cameras and so on.

In some implementations, the gathered information is used by the synthesizer to apply the camera-to-camera protocol. More specifically, the synthesizer may use this information when the first camera provides movement instructions to the second camera. In addition to the above information, the system may obtain IP addresses for each camera, video interface communication information for each camera, radio broadband information for each camera as well as any other communication protocols and addresses that may be used to enable the cameras to communicate with one another.

After the initial setup, flow proceeds to operation 420 in which detection criteria for the first and/or second cameras are established. The detection criteria may include detection thresholds, filters, calibration information and the like.

Figure 6:
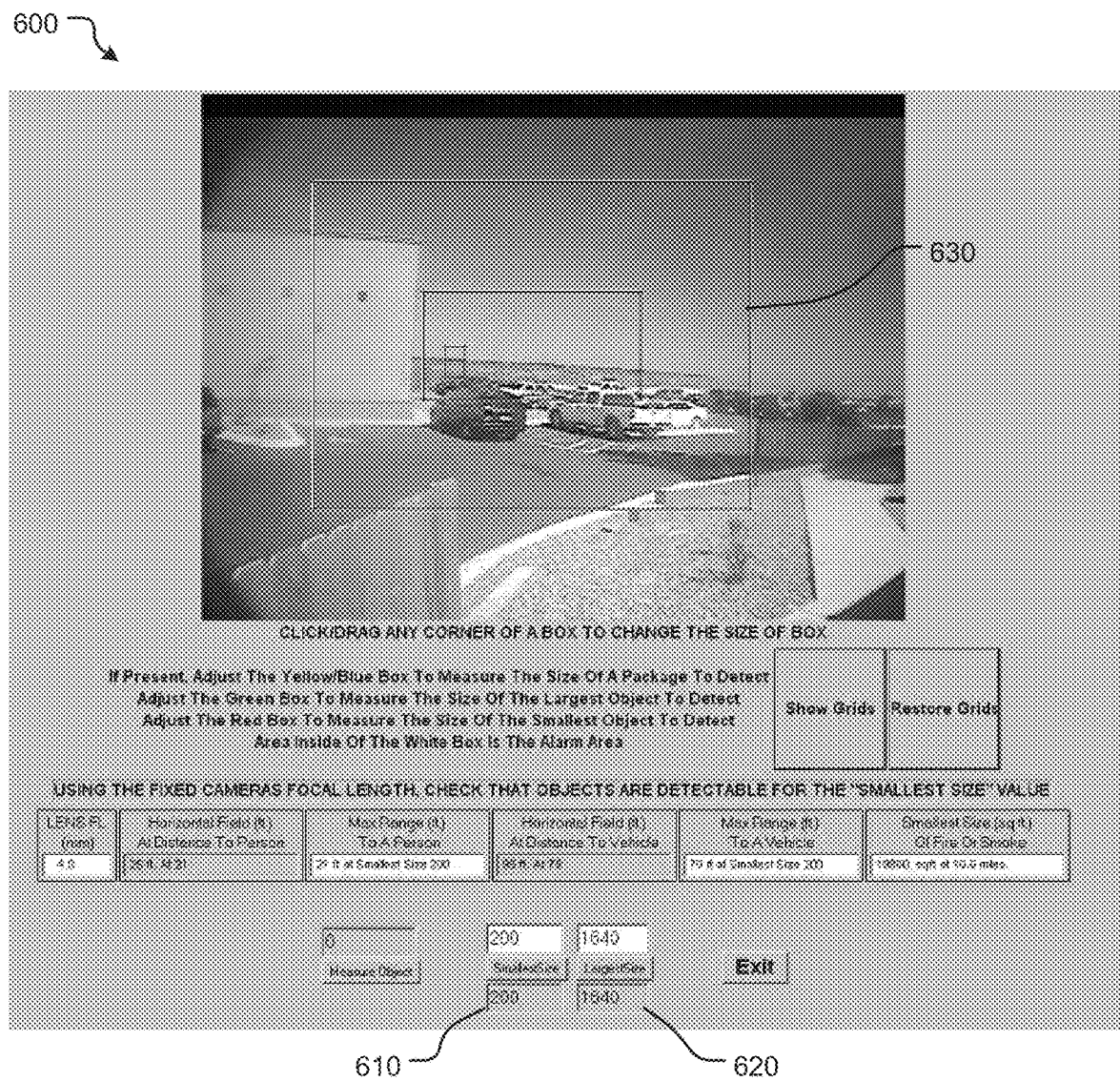
FIG. 6 illustrates how various regions and zones in an image may be defined for the synthesizer process analyses according to one or more embodiments of the present disclosure.

For example and referring to FIG. 6, FIG. 6 illustrates an example reference image 600 in which a user may provide defined threshold values for specific detection requirements. For example, a user may specify the smallest size 610 object (in pixels) that the synthesizer will identify when filtering an image. Changes smaller than this value will be ignored. The user also specifies the largest size 620 object (in pixels) that the synthesizer should use when filtering the image. Changes larger than this value will be ignored.

A field of view for the camera may also be specified. For example, a user may select or otherwise enclose an area 630 on the image 600 that the synthesizer will check for unwanted changes. Changes outside of the area 630 may be ignored.

Figure 7:
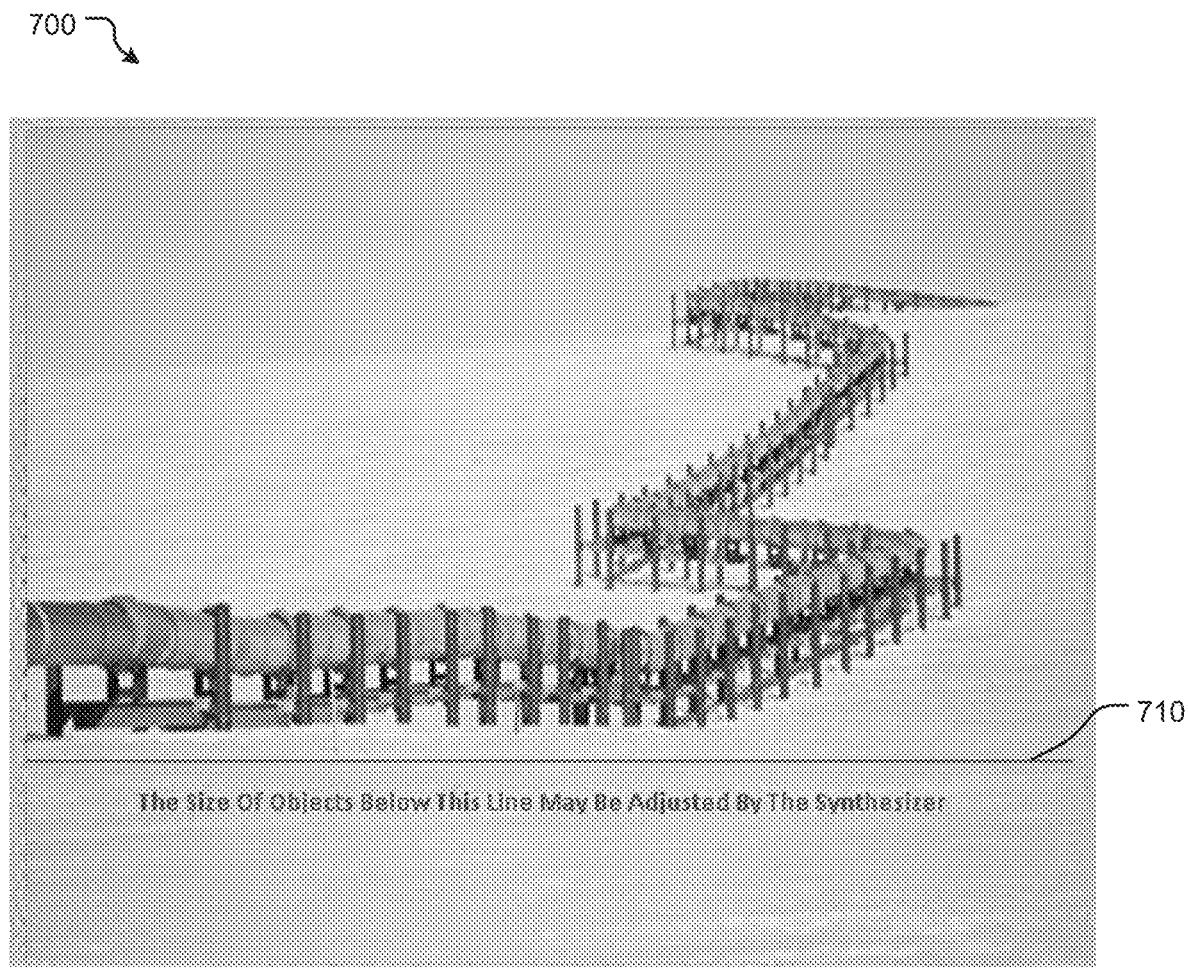
FIG. 7 illustrates how a detection distance algorithm may be used to detect a size of a target according to one or more embodiments of the present disclosure.

The setup detection criteria may also include a threshold that the synthesizer will use in determining a size of the target. For example and as shown in FIG. 7, the user may define within an image 700 the vertical location threshold 710 for determining the size of a target. More specifically, a user may select a point in the image 700. The vertical position of the point may be determined in pixels. This value is a threshold value that is used by the synthesizer in a distance determination process. More specifically, the distance determination process uses this value to assess the size of a target based on its distance from the first camera. The target's size may be adjusted based on the vertical pixel position of the target relative to the line 710 and its distance from the bottom of the image 700.

Referring back to FIG. 4, once the detection criteria have been established, flow proceeds to operation 430 in which known changes are captured or otherwise determined. For example and referring to FIG. 8, the first camera may capture an image 800. To capture the image 800, a user may select a learn button 810. The captured image 800 is then used as the reference image.

A second image is captured and the second image is subtracted from the reference image to create a difference image. Each pixel in the difference image is checked for a value greater than a threshold value (e.g., 100). For any pixel value in the difference image that is greater than the threshold value, the reference image pixel is set to specified value (e.g., 255). This causes the reference image to show highlighted pixels 820.

The above process may be repeated a predetermined number of times or until the process is stopped by the user. The data derived during each iteration of the process is added to the previous image so the end product (or the last image) is a sum of all data collected during the iterative process. When the process stops, the user has an image in which all changes in the scene are highlighted. The changes may be caused by any object's motion, reflections, glint from any crystal like object, i.e. concrete, snow, etc.

Once the learn process has stopped, the user may then select or "block" (shown by square 830) any area in the image 800 that should be ignored by the synthesizer during the check for unwanted changes. For example, in some embodiments, the area outside the block 830 should be ignored. In another embodiment, the area inside the block 830 should be ignored. This image is then used as a motion filter. The blocked area (or areas when multiple blocks are formed) form a separate image that becomes the zone filter. Both filters are subsequently used by synthesizer. In some embodiments, the motion filter and the zone filter may be combined to create an "all" filter.

Referring back to FIG. 4, flow proceeds to operation 430 in which the blocked areas and known changes in an image are identified. For example and turning to FIG. 9, the pixels whose values are set to the predefined value (e.g., 255) are identified and blocked out (e.g., with black square 910). Thus, the camera and any other user may be prevented from viewing this area.

More specifically, an operator or user may select any area on the image 900 to highlight the area. The user may then erase one or more points in the image 900 that should not be masked. All of the pixels in the area that was blocked and erased returns to its original pixel value. The image is then saved as a curtain array. The curtain array is subsequently used by the synthesizer to know what areas to ignore when checking for unwanted changes. Thus, even if changes occur in the area covered by the square 910, those changes will not be detected by the system.

Referring back to FIG. 4, flow then proceeds to operation 440 and the first camera and the second camera are calibrated. For example and referring to the image 1000 of FIG. 10, the synthesizer may use the data previously collected to command the second camera to view unwanted changes. That is, the synthesizer may use the data to determine which areas in the image should be defined as targets for the second camera.

For example, the first camera may capture the image in the left window 1010. A point in the left window 1010 is then identified and the first camera sends instructions to the second camera to pan, tilt and/or zoom to this location or near this location. The second camera captures a second camera image and displays it in the window on the right 1020.

A user may also use motion buttons 1030 associated with the second camera to center the second camera on a selected point 1040 in the center of the second camera image 1020. After each point selected in the first camera image is centered in the second camera image, the point is saved.

Each time a point is saved, the processor unit saves the coordinates of the selected point in the first camera image and the pan, tilt and/or zoom values for the selected point of the second camera.

This process may be repeated a number of times for a number of different areas or portions of the image 1000. Once this process is complete, the optimum pole position and the optimum coefficients used to associate the selected points to the angular pan, tilt, and/or zoom motions of the second camera may be calculated. These values are used by the synthesizer process to point the second camera to the unwanted change in the first camera image. As used herein, the term 'pole' is the center line axis of the moveable camera around which the camera moves horizontally.

Once a user has performed all the setup requirements and the second camera has been calibrated such as described, flow proceeds to operation 450 in which various operating modes of the cameras, or the system, may be determined and/or selected. In some embodiments the different modes are selected by an operator of the system. In other embodiments, the modes may be automatically determined based on various parameters. These parameters may include, a location of the system or of one or more cameras in the system, the time of day, perceived threat level of the unwanted change and so on.

The different modes may consist of an armed mode, a passive monitor mode and an active monitor mode. Further the active monitor and armed mode may utilize the scene synthesizer and camera-to-camera protocol for command and control of the moveable camera such as will be described in detail below. The armed mode is configured to alert security personnel and sends messages to first responders along with alert pictures. The passive monitor mode continuously captures and displays images from the fixed camera field of view only but may not send alerts to security or first responders. The active monitor mode continuously captures and displays images from the fixed and moveable cameras and uses the scene synthesizer to automatically detect and track any change within the fixed camera's field of view but does not make video records or report alarm events.

Figure 5:
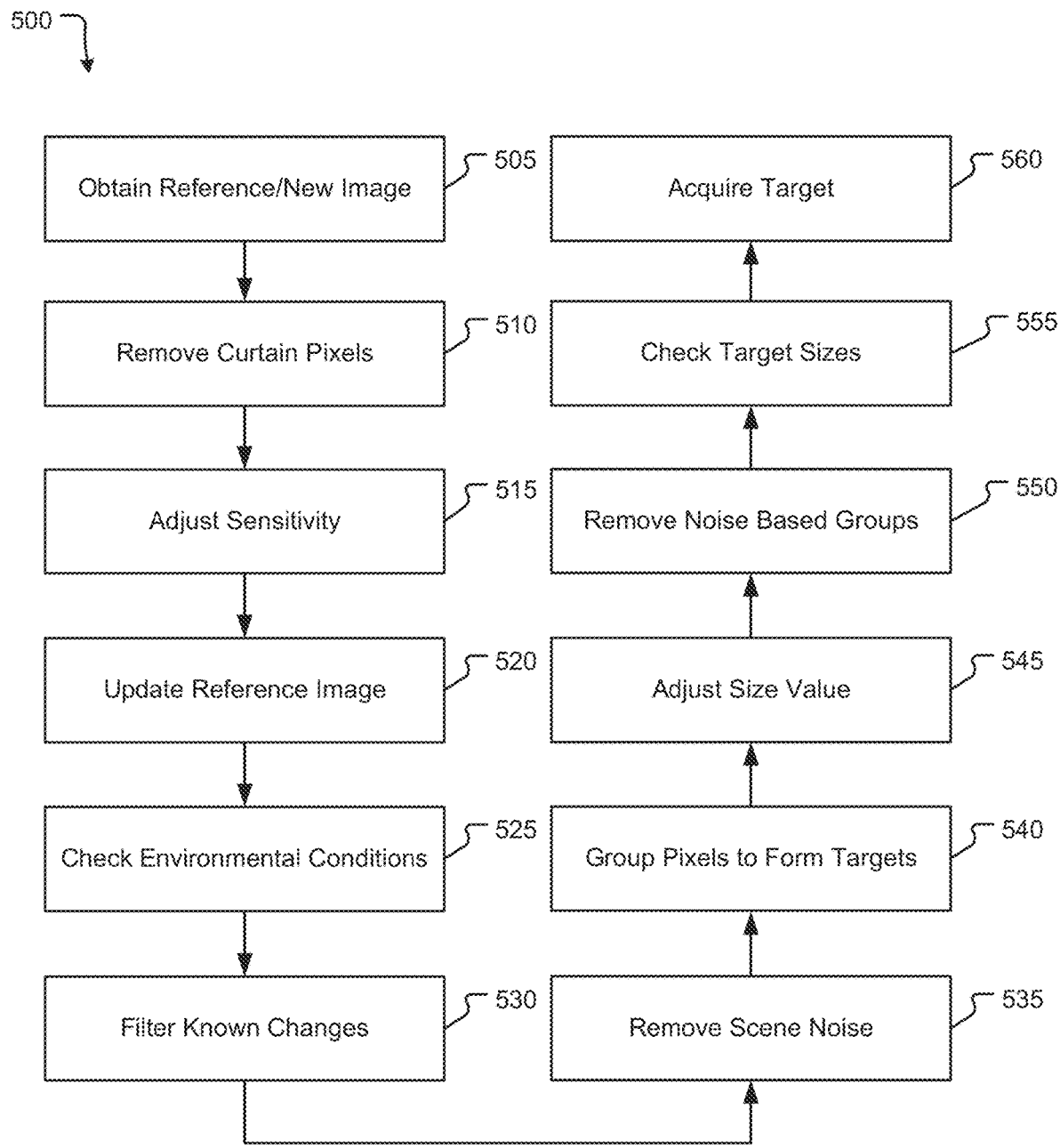
FIG. 5 illustrates a method for processing images using various filters according to one or more embodiments of the present disclosure.

FIG. 5 illustrates a method 500 in which a synthesizer may analyze captured images according to one or more embodiments of the present disclosure. In some embodiments, the method 500 may be used in conjunction with the system 100 described above with respect to FIG. 1 or with any of the methods described herein.

Method 500 begins at operation 505 when a reference image has been updated and/or a new image is obtained. In some embodiments, the reference image may be obtained by a first type of camera in a system such as, for example, a fixed camera.

Flow then proceeds to operation 510 in which the synthesizer determines whether a curtain filter is associated with the fixed camera 510. For example, as described above, a curtain filter may identify which portions of an image are to be ignored. If a curtain filter is present, the synthesizer compares all points in the curtain filter with those in the reference image and any secondary images. When each point in the various images match a point in the curtain filter, the reference and secondary image points are identified. As a result, changes in these areas will be ignored.

In operation 515 the images, and more particularly the synthesizer sensitivity value, is adjusted based on fixed camera pixel noise and pixel changes in the image. These values are obtained by subtracting the new image from the reference image. The synthesizer then creates a histogram of the pixel values in the array and sequentially checks the number of pixels in each of the histogram groups. Each group is compared with maximum permitted sensitivity values to label and create a listing of the groups.

The synthesizer then begins to sequentially sum the number of pixels in each group until the sum of the groups pixels are equal or greater than a threshold value (e.g., 30000). Once this threshold is reached, the summation stops and the sensitivity is adjusted based on the total number of groups that were included in the sum as well as one or more predefined threshold constants.

The final value is compared to a table of predetermined values where each value in the table is associated with the smallest size groups of pixels are detected. Following this check, the group count is compared with a table of maximum count versus target size values and the final count is adjusted to a limit defined by the table. This value becomes the new sensitivity value. Using this data, the sensitivity may be automatically raised or lowered.

Once the sensitivity has been adjusted, flow proceeds to operation 520 in which the reference image is updated. In some embodiments, the data from the new images may be used to update the reference image. More specifically, the synthesizer may generate or create a new reference image by summing fractions of the actual pixel values from the reference image with fractions of the actual pixel values from the new image.

Each pixel in the updated reference is updated by the summation of one fourth (¼) of the pixel value in the current reference array with three fourths (¾) of the pixel value in the new image array. This may prevent the moveable camera from becoming fixed on the same target in a group of targets and assures there will be more pixels on a target in frame to frame image captures. This weighted averaging permits the fixed camera to focus on the largest number of pixels target. Using this process, the fixed camera uses the moveable camera to automatically provide a view of all targets in the group as new images are captured.

Operation 525 provides that changes due to changing environmental conditions in the scene (e.g., the changes in the new image) are determined. In a more specific example, a determination may be made whether moving clouds, rain or snow, or any other environmental factors in the scene are contributing to changes within the new images.

A new array of the values derived from a pixel to pixel subtraction between the entire size of reference image and the entire size of the new image is created. The synthesizer then counts the total number of pixels in the difference array. If the number of pixels is greater than a predetermined threshold, there are too many environmental changes and the sensitivity is set to a value that stops any further processing in the synthesizer. The synthesizer repeats the previous operations until this value becomes less than the predetermined threshold.

When operation 525 completes, flow proceeds to operation 530 and a determination is made as to the difference between the updated reference image and the new image. More specifically, the synthesizer subtracts pixels in the new image from associated pixels in the reference image in order to obtain a differences array between the new image and updated reference image.

For example, filters (e.g., learned and blocked filters) of known environmental changes and blocked areas in a scene that were created during setup of the fixed camera may be applied to the difference image or array. More specifically, pixels in the difference array are set to a zero (0) value everywhere a difference array pixel is in the same location as a learn or block filter pixel. That is, the synthesizer uses the learned and blocked filters to remove known changes with the result that those changes do not trigger false alarms. As a result of application of these filters, the system may be able to detect very small changes with minimal or no false alarms.

In operation 535, the value of each remaining pixel in the difference array is compared to the sensitivity. More specifically, the remaining pixels form a new array where each pixel's value in the array is compared with the sensitivity value to determine if the pixel has a value that is greater than or equal to the sensitivity value that was found in operation 515. Pixel values that are below the threshold are considered noise and ignored. Pixel values that are greater than or of equal value may form a new array and are processed further.

Flow then proceeds to operation 540 in which tests of the array are performed to determine the proximity of any one pixel to any neighboring pixels in the array. In some embodiments, the pixels, and more specifically pixels that are localized within a predetermined threshold distance with respect to one another (e.g., 1, 2, 3 or 4 pixel locations away), are formed into groups. As described above, each group becomes a potential target. As a result of this process, only groups whose pixels are above a certain sensitivity (e.g., 520) are the only groups available for further processing.

In operation 545 the size value (e.g., the number of pixels) of any one of the groups may be adjusted. For example, based on a group's vertical position from a selected point in an image (e.g., a zeroth vertical raster line of a new image array and its position relative to the position threshold), the group size value may be adjusted to larger or smaller values. The size of each group is then compared to defined minimum and maximum threshold values. Any group whose values are not within the thresholds are ignored.

Flow then proceeds to operation 550 in which the shape of all the groups are analyzed to determine if any group has been formed as a result of any noise (e.g., glint, a wire, platform and or pole vibrations and other types of scene noise). The synthesizer selects a point in each group and checks a ratio of the horizontal size/vertical size and vertical size/horizontal size. If the ratio is more than a predetermined threshold, the group is ignored.

In 555 the synthesizer uses determines the current pointing coordinates of the fixed camera image with respect to a selected target. Once the check has been performed, flow proceeds to operation 560, in which a priority for target acquisition, pointing and viewing is established.

More specifically, the synthesizer may process all targets to check the size of each target by comparing the each group's pixel size to all other groups. The largest group of pixels is deemed to be the target of interest. A command is then sent to the second camera to view or otherwise focus on the target of interest.

If other large pixel groups are also present, the system may cycle through each target group during repeated cycles. More specifically, if one or more groups pass the size test, the fixed camera instructs the moveable camera to acquire the next target during each iteration of the process. It should be noted that because of the weighted averaging of the reference image with the new image, the largest target may not be the largest target physically but the largest in terms of measured pixel differences.

In some embodiments, the synthesizer pointing algorithm includes determining a magnification required to maximize the size of the target in the moveable camera field of view. The synthesizer is also configured to calculate the amount of motion required to move to the new location coordinates. These values are also used to calculate the total amount of time required for the moveable camera to execute the received adjustment.

The fixed camera uses the camera-to-camera protocol to transmit all of the above commands and information to the moveable camera and then waits the determined amount of time before capturing new images from the fixed and moveable cameras. The camera-to-camera commands includes commands to: the target location coordinates; center the target in the PTZ camera lens field of view; adjust the moveable camera lens; magnify the fixed camera selected target; and show a picture of the target after making all adjustments.

Figure 9:
FIG. 9 illustrates how a blocking filter is applied to an image according to one or more embodiments of the present disclosure.
Figure 10:
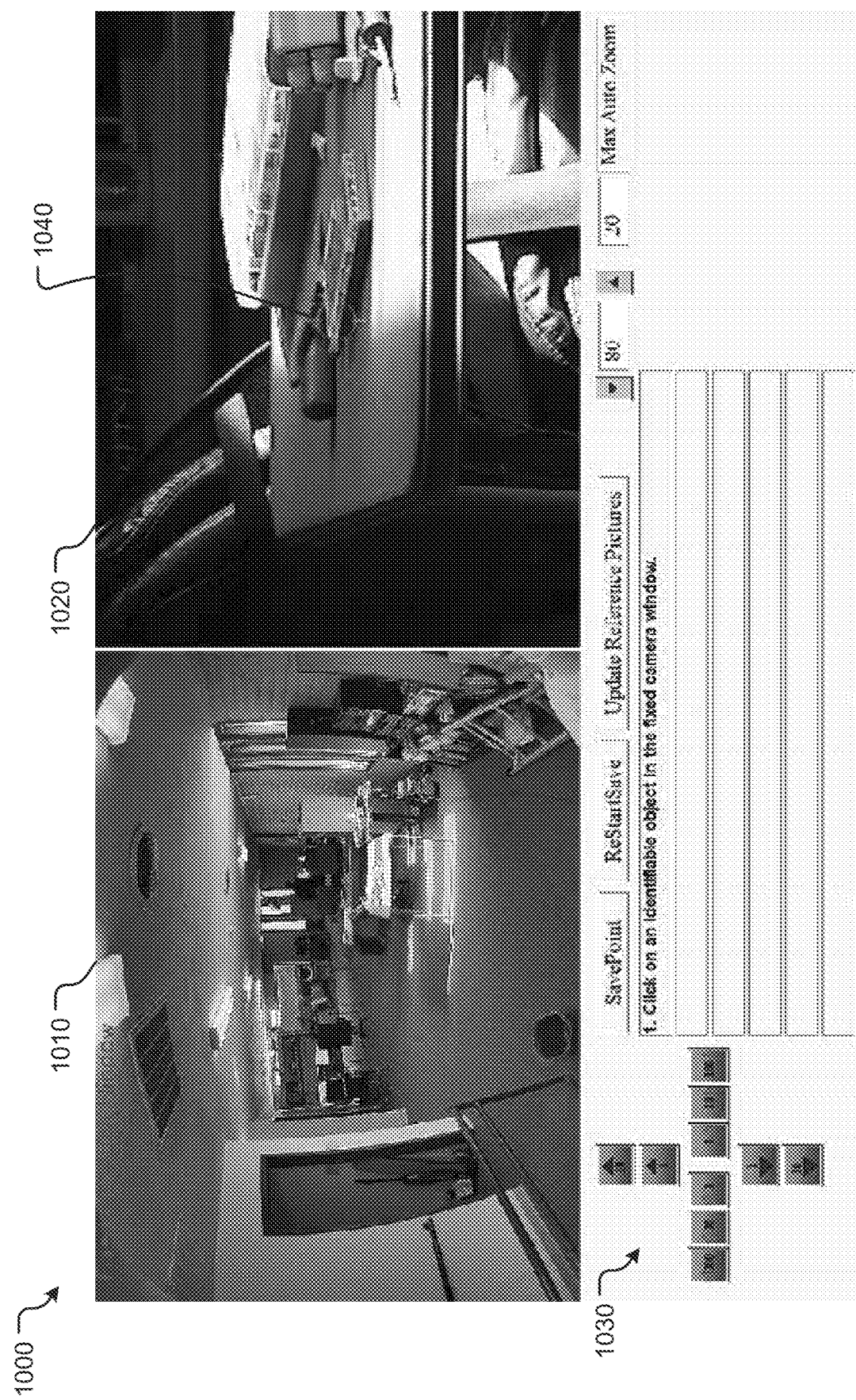
FIG. 10 illustrates how a moveable camera may be calibrated according to one or more embodiments of the present disclosure.
Figure 11:
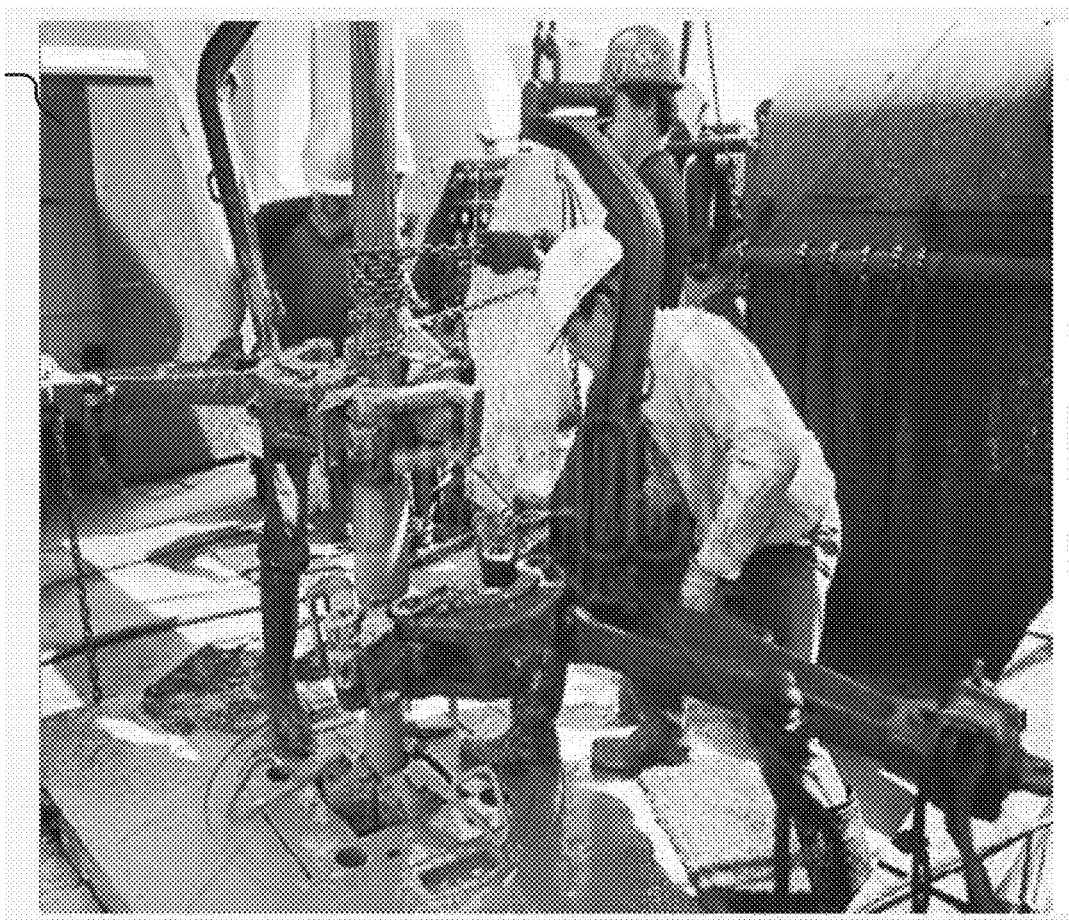
FIG. 11 illustrates an example user interface for learning about, erasing or blocking portions of a received image according to one or more embodiments of the present disclosure.
Figure 12:
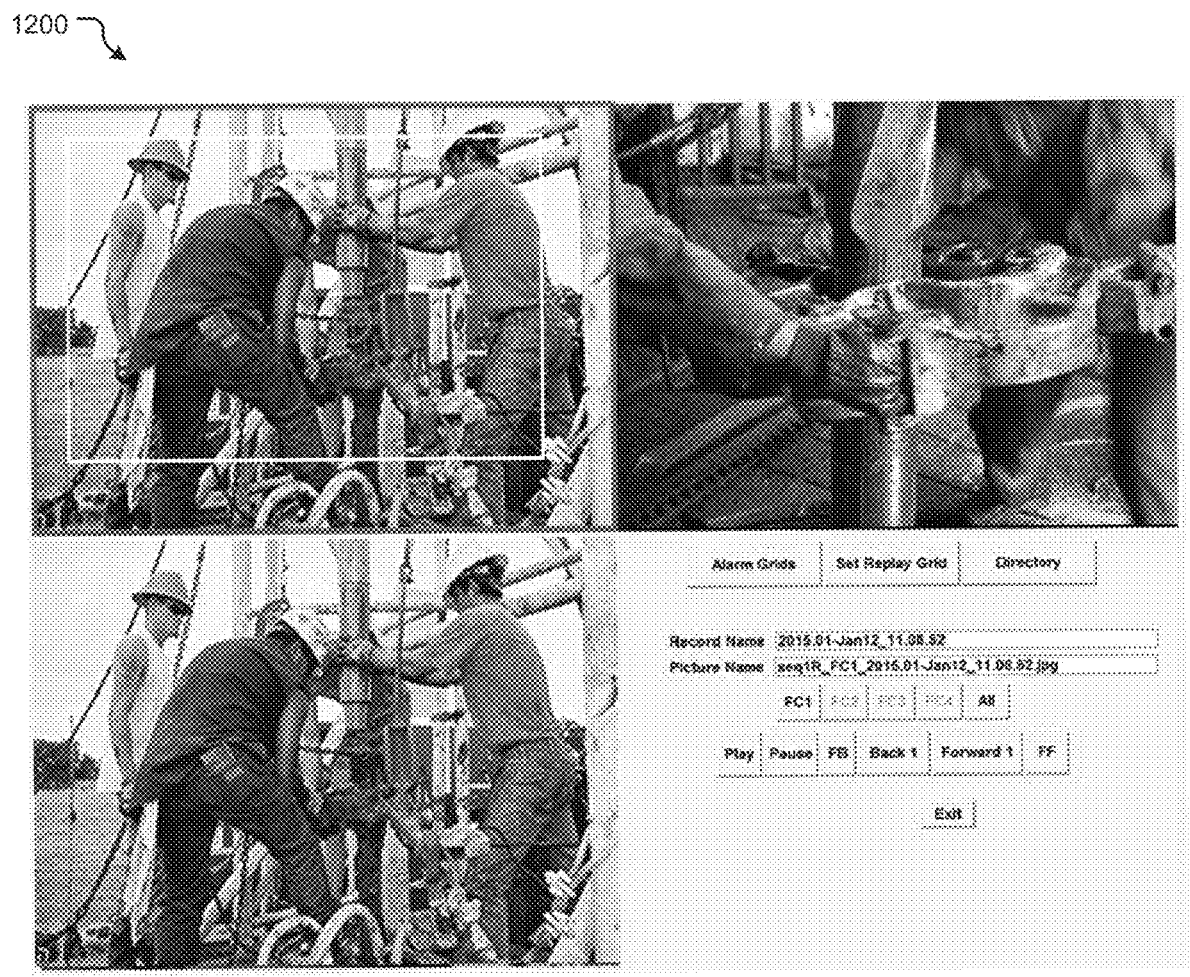
FIG. 12 illustrates an example user interface that shows images from a first type of camera and a second type of camera according to one or more embodiments of the present disclosure.

Although described above, the following is a brief summary of the sample images shown in FIGS. 6-10 as well as other sample images shown in FIGS. 11-12. In some embodiments, the sample images shown may include images and a user interface of the system described herein.

FIG. 6 illustrates how various regions and zones in an image may be defined for the synthesizer process analyses according to one or more embodiments of the present disclosure. For example, when an image is received such as shown in FIG. 6, various targets, target sizes, regions and zones within the image may be defined.

The box 630 may be adjusted by clicking and dragging any of its corners. The area inside the box 630 defines the area the synthesizer will apply analyses when checking the changes in the image 600. The additional boxes can be adjusted in the same way and may be used to measure potential target sizes whose size values may be input and saved in the boxes at the bottom of the window.

FIG. 7 illustrates how a detection distance algorithm may be used to detect a size of a target according to one or more embodiments of the present disclosure. For example, the detection distance algorithm may be used to determine one or more targets in an image based on, for example, the amount of pixels an image is comprised of and/or a position of the target in an image such as described above.

Figure 8:
FIG. 8 illustrates how a learn filter is developed according to one or more embodiments of the present disclosure.

FIG. 8 illustrates how a learn filter is developed according to one or more embodiments of the present disclosure. The highlighted areas are the pixel points in the learn image array. The synthesizer will compare these points with a difference image array and where there are location matches, that pixel in the differences array will be set to zero (0).

FIG. 9 illustrates how a blocking filter is applied to an image 900 according to one or more embodiments of the present disclosure. For example, as shown in FIG. 9, the blocked out area 910 may be an area in which targets should be ignored.

FIG. 10 illustrates how a moveable camera may be calibrated according to one or more embodiments of the present disclosure. More specifically, FIG. 10 illustrates how a moveable camera may be calibrated with respect to a fixed camera such as described above. An operator begins by selecting a point in the left image 1010. The user may then use the motion buttons 1030 to move the moveable camera to center the point selected in the left image 1010 in the moveable camera image on the right 1020. When the point is centered in the moveable camera image, a mathematical algorithm calculates and saves coefficients associated with the point 1040. The coefficients are then used to accurately point the moveable camera to the point 1040. Movement can occur whenever a point around the selected point 1040 is manually selected by an operator or the coordinates for the point 1040 are determined by the synthesizer process for a camera-to-camera movement command.

FIG. 11 illustrates an example user interface 1100 for learning about, erasing or blocking portions of a received image 1110 according to one or more embodiments of the present disclosure. For example, when the image 1110 is received, one or more portions of the image 1110, or the entire image, may be blocked so the system can analyze or ignore various movement within the image or zone of the image such as described above.

FIG. 12 illustrates an example user interface 1200 that shows images from a first type of camera and a second type of camera according to one or more embodiments of the present disclosure. As shown in FIG. 12, once an image is received in a first camera, the first camera may direct movement and zoom of a second camera without, for example, human intervention. The window at lower left is the first camera live picture window and is continuously updated to show real time first camera pictures. The window at upper right shows the pictures from the second type of camera that is commanded by the first camera. The upper left window is a freeze window that always shows the point in the scene of the first camera where the second camera was commanded to point at and is commanded and controlled by the synthesizer process.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

It should be noted that the embodiments described herein may be applicable to both products and services. As such, the terms may be interchangeable with respect to one another. Thus, when a request or an offer is made with respect to a product or item, the same or similar offer or request may be made with respect to a service. As such, a vendor may also be a service provider and a service provider may be viewed as a vendor. Further, a user of the system may be both a vendor and a consumer.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

I claim:

1. A method, comprising:
identifying first point in a field of view of a fixed camera;
sending a first instruction to a pan, tilt and zoom (PTZ) camera that causes the PTZ camera to center the first point in a field of view of the PTZ camera;
identifying a second point in the field of view of the fixed camera;
sending a second instruction to the PTZ camera that causes the PTZ camera to center the second point in the field of view of the PTZ camera; and
setting a movement boundary for the PTZ camera based, at least in part, on the first point and the second point, the movement boundary specifying a boundary of movement of the field of view of the PTZ camera within the field of view of the fixed camera.

2. The method of claim 1, wherein the first point is selected by an individual.

3. The method of claim 1, wherein the first point is associated with an object.

4. The method of claim 1, wherein the first instruction is automatically provided to the PTZ camera.

5. The method of claim 1, wherein the first instruction is provided to the PTZ camera in response to input received via a user interface.

6. The method of claim 1, further comprising associating coordinates of the first point within the field of view of fixed camera with one or more of pan characteristics, zoom characteristics or zoom characteristics of the PTZ camera.

7. The method of claim 1, further comprising receiving a mode selection for an operating mode of one or more of the fixed camera or the PTZ camera.

8. The method of claim 7, wherein the operating mode is associated with a movement sensitivity of one or more of the fixed camera or the PTZ camera.

9. The method of claim 1, wherein the first point is associated with Global Positioning System (GPS) coordinates.

10. A system, comprising:
a fixed camera having a fixed field of view;
a moveable camera having a field of view at least partially contained within the field of view of the fixed camera; and
a processor that causes the moveable camera to:
  center a first point in the fixed field of view of the fixed camera within the field of view of the moveable camera;
  center a second point in the fixed field of view of the fixed camera within the field of view of the moveable camera; and
  set a movement boundary for the moveable camera based, at least in part, on the first point and the second point, the movement boundary specifying a boundary of movement of the field of view of the moveable camera within the field of view of the fixed camera.

11. The system of claim 10, wherein the moveable camera is a PTZ camera.

12. The system of claim 10, wherein the processor causes storage of an angular position of the moveable camera when the first point is centered within the field of view of the moveable camera.

13. The system of claim 10, wherein the processor causes storage of an angular position of the moveable camera when the second point is centered within the field of view of the moveable camera.

14. The system of claim 10, wherein the processor causes storage of a zoom value associated with the moveable camera when the first point is centered within the field of view of the moveable camera.

15. The system of claim 10, wherein the processor causes storage of a zoom value associated with the moveable camera when the second point is centered within the field of view of the moveable camera.

16. The system of claim 10, wherein the processor causes storage of a pan value associated with the moveable camera when the first point is centered within the field of view of the moveable camera.

17. The system of claim 10, wherein the processor causes storage of a pan value associated with the moveable camera when the second point is centered within the field of view of the moveable camera.

18. The system of claim 10, wherein the first point is associated with a selected object.

19. The system of claim 10, wherein the processor causes storage of an operating mode of one or more of the fixed camera or the moveable camera.

20. A method, comprising:
displaying, in a user interface associated with a camera-to-camera control system, an image, the image being received by a fixed camera;
identifying a first point within the image;
causing a moveable camera to center its field of view on the first point within the image;
identifying a second point within the image;
causing the moveable camera to center its field of view on the second point within the image; and
restricting movement of the moveable camera based, at least in part, on the first point and the second point.

\* \* \* \* \*